United States Patent
Chang et al.

(10) Patent No.: US 7,291,026 B2
(45) Date of Patent: Nov. 6, 2007

(54) MEMORY CARD CONNECTOR

(75) Inventors: Wei-Sun Chang, Taipei (TW);
 Chia-Chen Chang, Chung (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/343,295

(22) Filed: Jan. 30, 2006

(65) Prior Publication Data
US 2007/0082521 A1    Apr. 12, 2007

(30) Foreign Application Priority Data
Oct. 7, 2005    (TW) ............................... 94217452 U

(51) Int. Cl.
 *H01R 13/62* (2006.01)
(52) U.S. Cl. .................................... 439/159
(58) Field of Classification Search ................ 439/159, 439/630
See application file for complete search history.

(56) References Cited

U.S. PATENT DOCUMENTS 5,161,989 A * 11/1992 Okubo et al. ................ 439/159
5,286,214 A *  2/1994 Takahashi .................... 439/159
6,482,030 B1 * 11/2002 Kuo .......................... 439/541.5
6,537,090 B2 *  3/2003 Ozawa ........................ 439/159
6,641,413 B2 * 11/2003 Kuroda ........................ 439/159
6,648,694 B2 * 11/2003 Takamori et al. ........... 439/630
6,669,493 B2 * 12/2003 Kuroda ........................ 439/159
6,761,569 B2 *  7/2004 Nakamura ................... 439/159
6,816,386 B2 * 11/2004 Oguchi et al. .............. 361/769

* cited by examiner

*Primary Examiner*—Tulsidas C. Patel
*Assistant Examiner*—Harshad Patel
(74) *Attorney, Agent, or Firm*—Charles S. Cohen

(57) ABSTRACT

A memory card connector includes an insulative housing having a terminal-mounting section which mounts a plurality of conductive terminals having contact portions for engaging appropriate contacts on a memory card. The housing at least in part defines a card-receiving cavity for receiving the memory card. A card eject mechanism includes a slider movably mounted on the housing. The slider is engageable with the memory card for movement therewith into and out of the cavity. The card eject mechanism includes an ejection spring to bias the slider and memory card in an ejection direction. The slider has an elongated guide slot between a pair of opposite parallel side walls extending longitudinally in the direction of movement of the slider. A shielding metal shell is mounted on the housing and includes an elongated guide tab projecting into the guide slot. The guide tab has opposite longitudinal planar surfaces opposing the side walls of the slot.

19 Claims, 5 Drawing Sheets

MEMORY CARD CONNECTOR

FIELD OF THE INVENTION

This invention generally relates to the art of electrical connectors and, particularly, to a memory card connector.

BACKGROUND OF THE INVENTION

Memory cards are know in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multimedia cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card, itself, writes or reads via the connector and can transmit between electrical appliances, such as a word processor, personal computer, personal data assistant or the like. The card may be used in applications such as mobile or cellular telephones which are actuated and permit data access after identifying an identification code stored on a SIM (subscriber identification module) card. The SIM card has a conductive face with an array of contacts, and the mobile phone has a SIM card connector with terminals for electrical connection with the contacts of the SIM card to ensure the subscriber identification confirmation.

A typical memory card connector includes some form of dielectric housing which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and at least one longitudinal side wall section extends forwardly from one or both ends of the rear section at one or both sides of the cavity. The metal shell has a top plate substantially covering the dielectric housing, with side plates extending downwardly over the side wall sections of the housing. One or both of the side wall sections of the housing define the sides of the card-receiving cavity.

Some card connectors include a card eject mechanism whereby the memory card is simply inserted into the connector, and the eject mechanism is used to facilitate removal of the card from the connector. Some eject mechanisms include slider members which engage the memory card for movement therewith into and out of the connector. Latches, cams, eject devices and other operative components then are operatively associated with the slider rather than the memory card itself. One type of card eject mechanism includes a heart-shaped cam slot in the slider, with a pin member operatively biased into the heart-shaped cam slot, and with a spring member to normally bias the slider in a direction of withdrawal of the memory card. This type of card eject mechanism is called a "push/push type" ejector in that the memory card first is pushed into the cavity of the connector to a latched operative position, and a second push on the card is effective to release the card and allow the spring to eject the card from its latched position.

Taiwan Patent No. M246852, published Oct. 11, 2004, discloses a memory card connector with an eject mechanism which includes a slider member having a protrusion formed at the top thereof. The metal shell has a guide slot in the top plate or wall thereof for slidably receiving the protrusion. Two opposite sides of the protrusion ride along and are supported against the opposite edges of the slot. With the metal shell stamped and formed of sheet metal material, the thickness of the top wall or plate is quite small. Therefore, the slot provides only a very small cross-sectional area which engages the protrusion to support the protrusion during sliding of the slider member. If the thin metal material along the slot, or even the top plate, itself, becomes deformed, the slot is not able to support the protrusion and the slider member is unable to slide smoothly during insertion and ejection of the memory card. Repeated card insertions actually results in complete deformation of the metal material and the eject mechanism becomes defective The present invention is directed to solving these problems.

SUMMARY OF THE INVENTION

An object, therefore, of the invention is to provide a new and improved memory card connector of the character described.

In the exemplary embodiment of the invention, the memory card connector includes an insulative housing having a terminal-mounting section which mounts a plurality of conductive terminals having contact portions for engaging appropriate contacts on a memory card. The housing at least in part defines a card-receiving cavity for receiving the memory card. A card eject mechanism includes a slider movably mounted on the housing. The slider is engageable with the memory card for movement therewith into and out of the cavity. The card eject mechanism includes an ejection spring to bias the slider and memory card in an ejection direction. The slider has an elongated guide slot between a pair of opposite parallel side walls extending longitudinally in the direction of movement of the slider. A shielding metal shell is mounted on the housing and includes an elongated guide tab projecting into the guide slot. The guide tab has opposite longitudinal planar surfaces opposing the side walls of the slot.

According to one aspect of the invention, the metal shell is stamped and formed of sheet metal material, and has a top wall forming a top of the cavity. The elongated guide tab is stamped and formed out of an opening in the top wall and projects inwardly therefrom. The width of the elongated guide tab is significantly greater than the thickness of the top wall of the shell.

According to another aspect of the invention, a pair of the elongated guide tabs are spaced from each other in the direction of movement of the slider. The spacing between the guide tabs is less than the length of the guide slot in the slider.

According to a further aspect of the invention, the slider has a guide groove, and the housing has a guide rib projecting into the guide groove. The guide slot and guide tab are at one side (e.g. the top) of the slider and the guide groove and guide rib are at an opposite side (e.g. bottom) of the slider.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
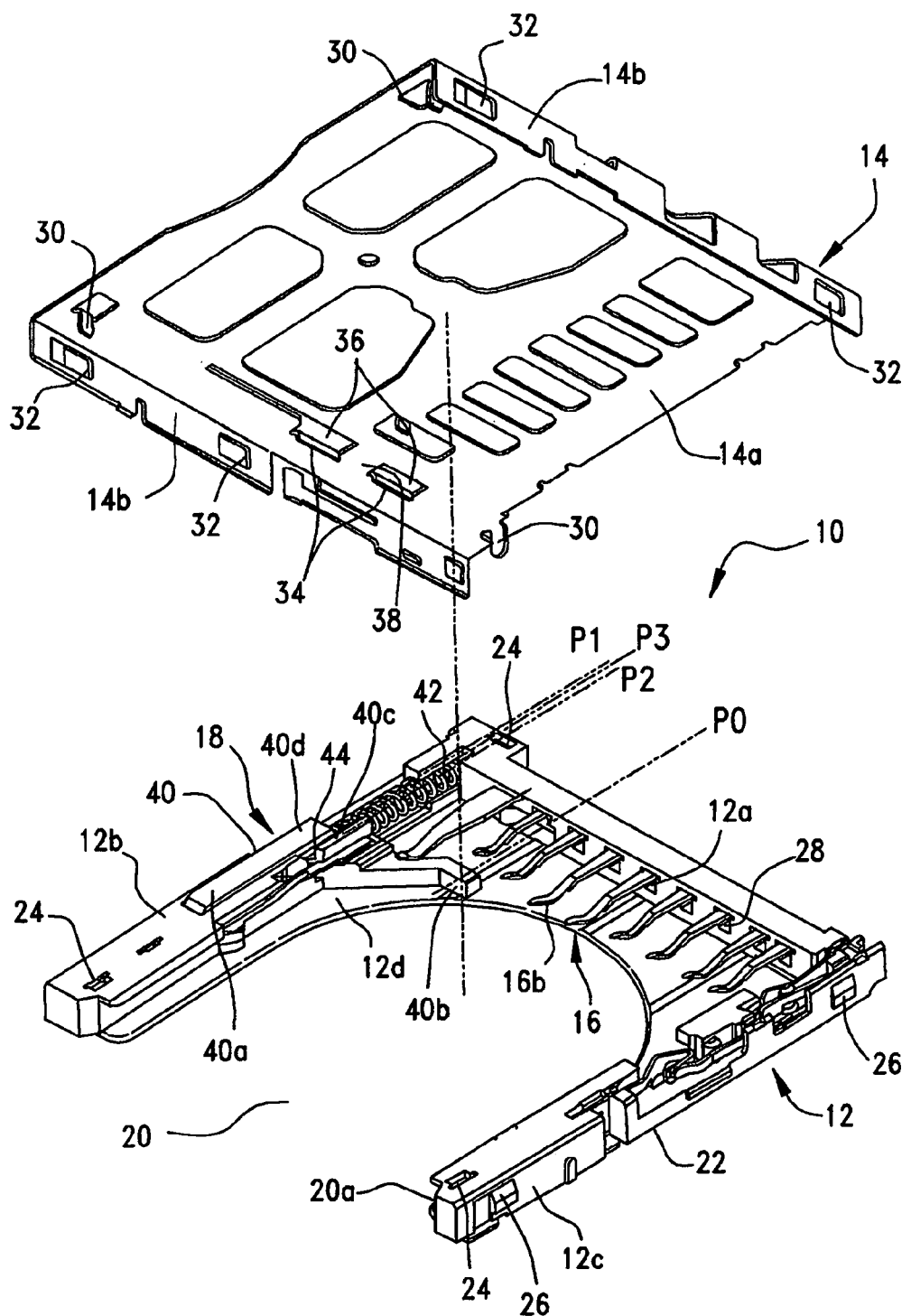
FIG. 1 is a perspective view of a memory card connector according to the invention, with the metal shell removed from the housing.
Figure 2:
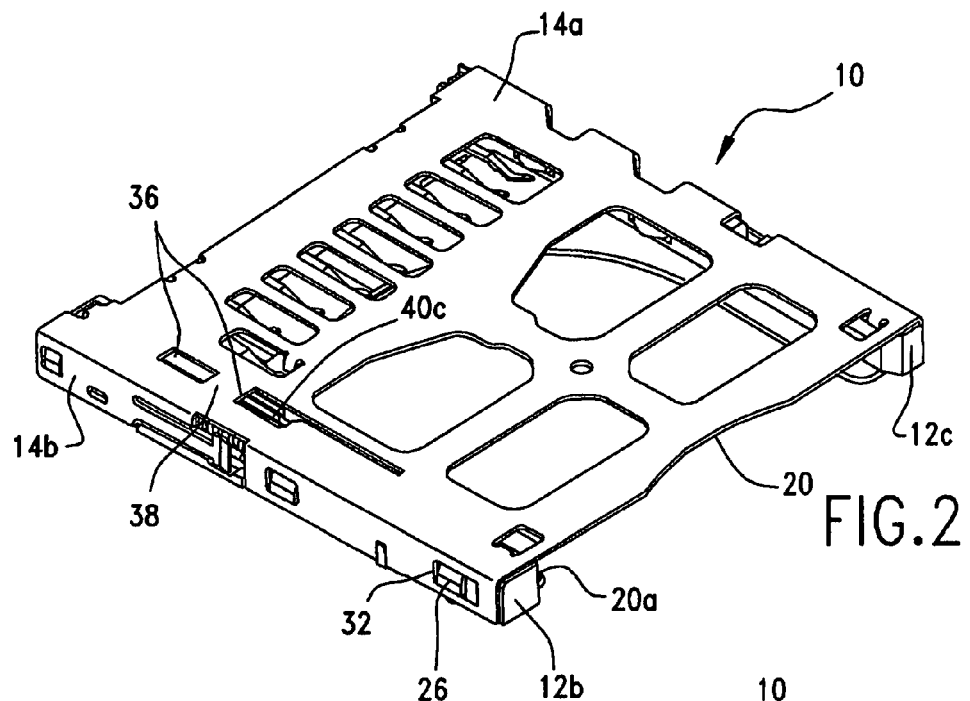
FIG. 2 is a top perspective view of the connector fully assembled.
Figure 3:
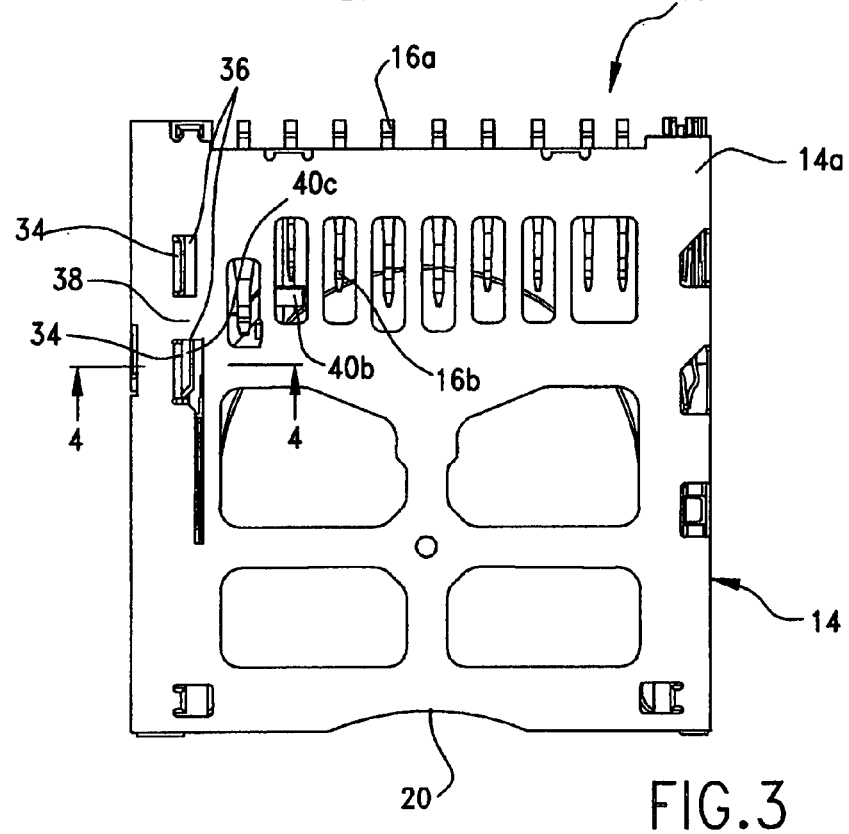
FIG. 3 is a top plan view of the connector.

Referring to the drawings in greater detail, and first to FIGS. 1-4, the invention is embodied in a memory card connector, generally designated 10, which includes an insulative housing, generally designated 12, and a shielding metal shell or cover, generally designated 14, along with a plurality of terminals, generally designated 16, mounted on the housing. A card eject mechanism, generally designated 18, also is mounted on the housing and is operatively associated with the metal shell, as described hereinafter. The housing is fabricated of insulating material such as molded plastic, and the metal shell is stamped and formed of sheet metal material. The housing and the shell combine to define a card-receiving cavity 20 for receiving a memory card, the cavity having an open mouth 20a. The mouth permits insertion and withdrawal of the memory card into and out of cavity 20.

The molded plastic insulative housing 12 of connector 10 may be generally U-shaped (as shown) or L-shaped (not shown). In either event, the housing has a rear terminal-mounting section 12a which traverses the rear of cavity 20, along with a longitudinal side wall section 12b (and 12c) which extends forwardly from one or both ends of the rear section to define one or both sides of cavity 20. The housing has a bottom plate 12d, and the overall housing has a bottom surface 22 for mounting on top of a printed circuit board (not shown). The top of the housing has a plurality of locating slots 24, and a pair of chamfered latch bosses 26 are formed on the outside of each side wall section 12b and 12c, all for purposes described hereinafter.

Terminals 16 are mounted within a plurality of through passages 28 (FIG. 1) in the rear terminal-mounting section 12a of the housing. Each terminal includes a tail portion 16a (FIG. 3) generally flush with bottom surface 22 of the housing for connection, as by soldering, to appropriate circuit traces on the printed circuit board. Terminals 16 also have contact portions 16b for engaging appropriate contacts on the memory card, such as at the top front of the card, when the card is fully inserted into cavity 20.

Metal shell 14 of connector 10 includes a top wall 14a and depending side walls 14b. A plurality of locating tabs 30 are stamped and formed from top wall 14a of the metal shell, and a plurality of latch openings 32 are stamped out of side walls 14b of the shell. As the metal shell is mounted onto the top of housing 12, locating tabs 30 are inserted into locating slots 24 at the top of the housing to properly locate the shell on the housing. The shell is locked to the housing as latch openings 32 in the side walls of the shell snap into latching engagement with the chamfered latch bosses 26 at the outsides of side wall sections 12b and 12c of the housing.

Still referring to metal shell 14, a pair of elongated guide tabs 34 are stamped and formed out of openings 36 in top wall 14a of the metal shell. The two guide tabs are separated by a spacing defined by a section 38 of top wall 14a of the metal shell.

Figure 8:
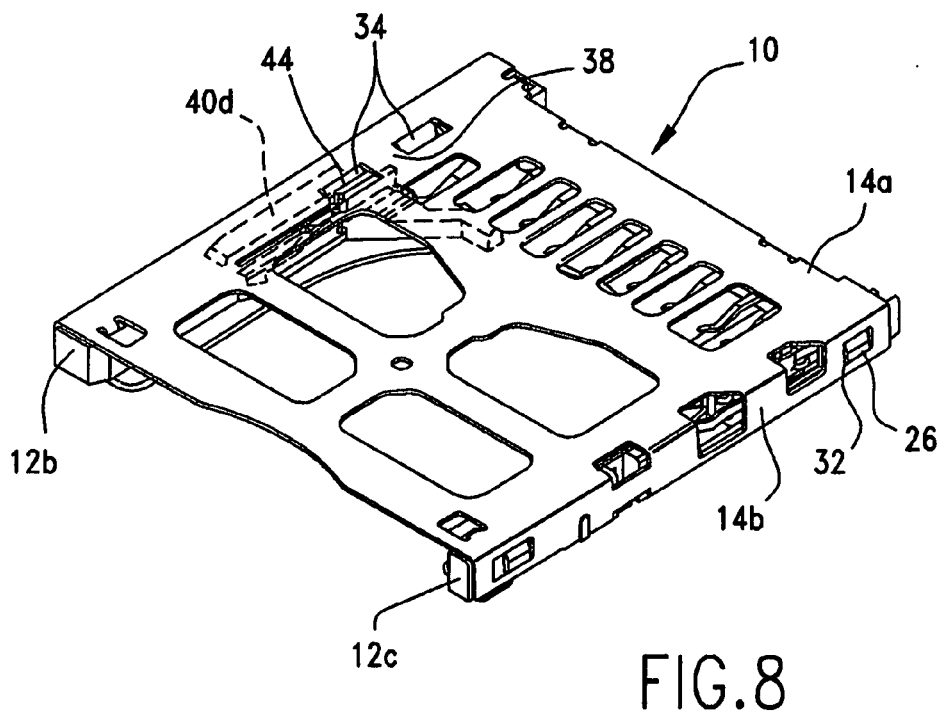
FIG. 8 is a top perspective view showing the slider in dotted lines, before it is pushed by a memory card.
Figure 9:
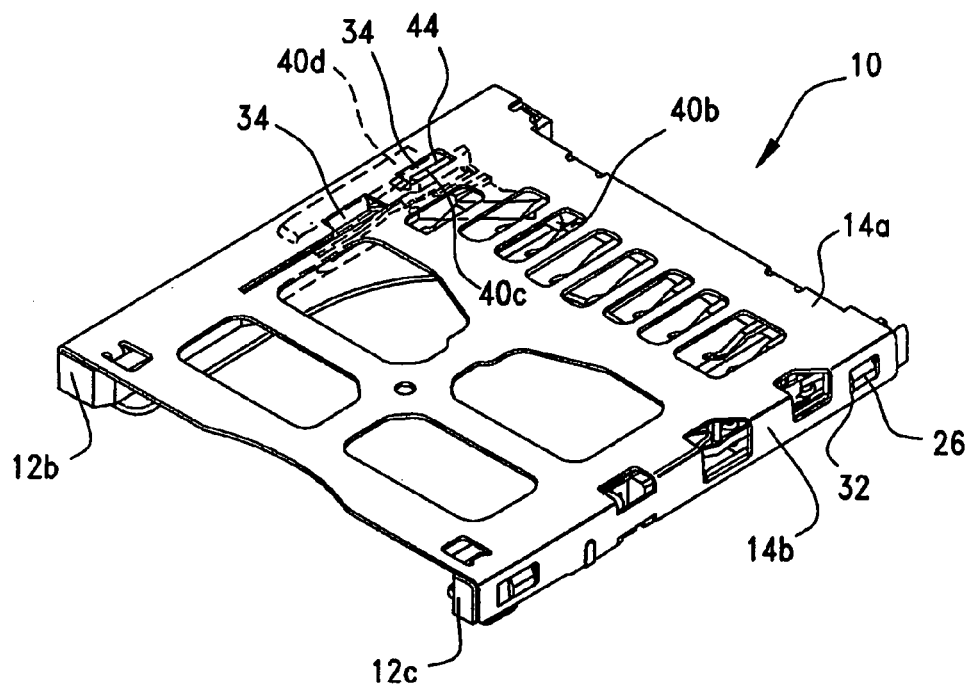
FIG. 9 is a view similar to that of FIG. 8, with the slider as it would be pushed inwardly by the memory card.

Card eject mechanism 18 is of a "push/push type" ejector in that the memory card first is pushed into cavity 20 to a latched operative position, and a second push on the card is effective to release the card and allow a spring to eject the card from its latched position. Such card eject mechanisms are well known in the art. Suffice it to say, card eject mechanism 18 includes a slider 40 which is movably mounted on housing 12 and is engageable with the memory card for movement into and out of cavity 20 between a card insertion or connection position (FIG. 9) whereat the card is latched in its operative position and a withdrawal or inoperative position (FIG. 8). Such push/push type eject mechanisms typically include a heart-shaped cam slot (not shown) in slider 40, with a pin member (not shown) operatively biased into the heart-shaped cam slot. A coil spring member 42 normally biases slider 40 in a direction of withdrawal of the memory card.

Figure 4:
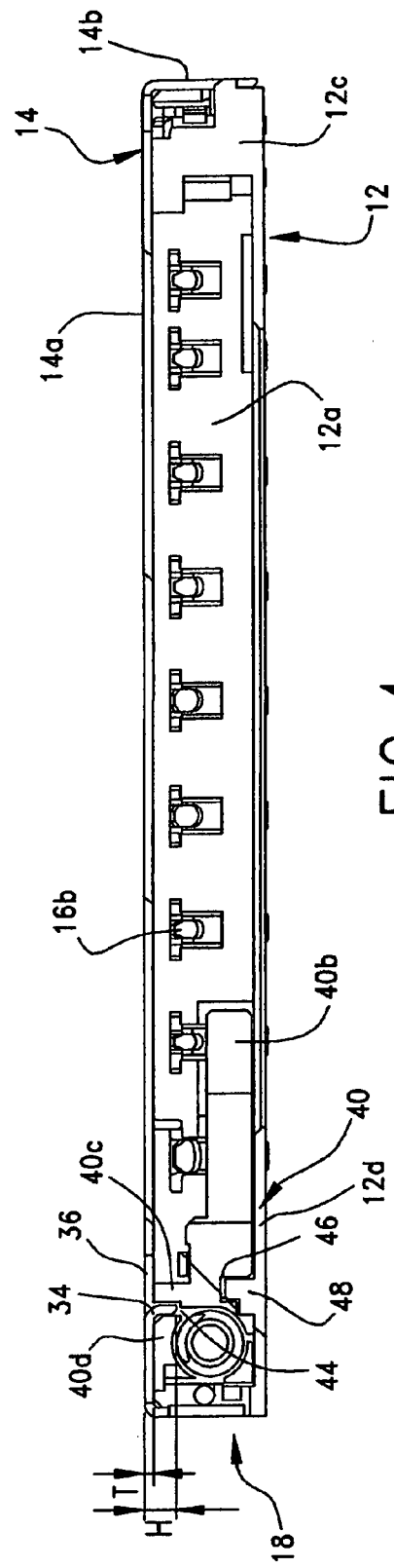
FIG. 4 is a front elevational view of the connector, partially in section along line 4-4 in FIG. 3.
Figure 5:
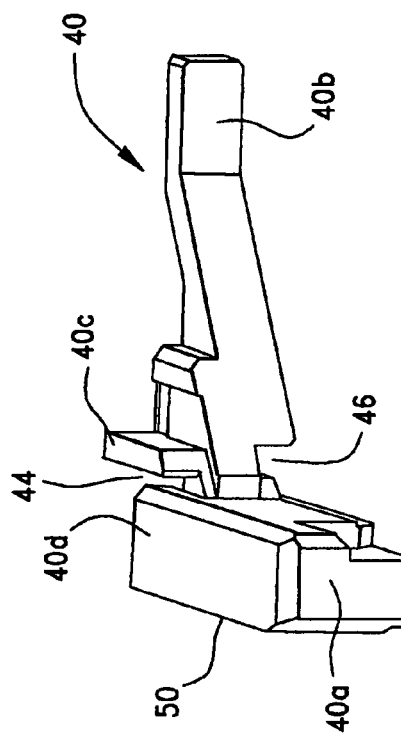
FIG. 5 is a perspective view of the slider of the eject mechanism.
Figure 6:
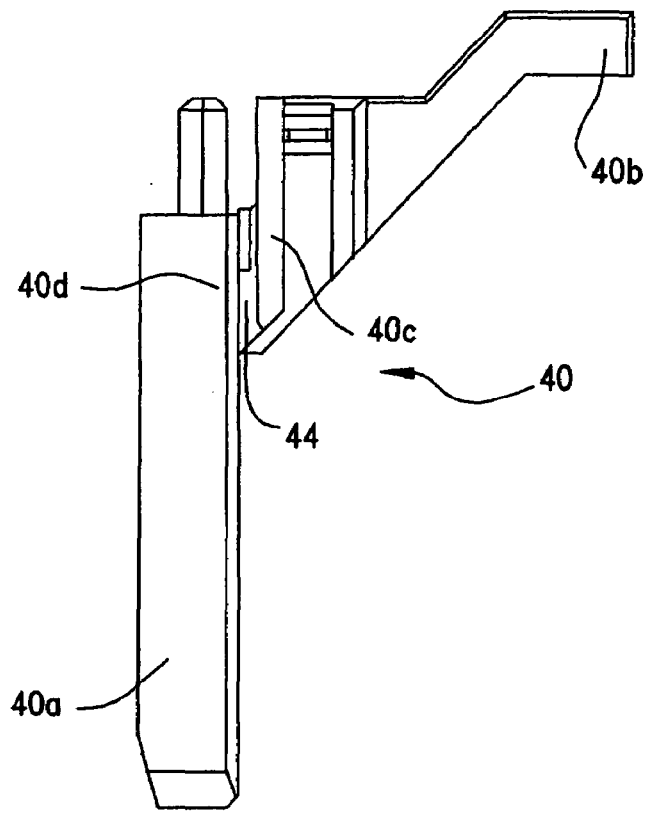
FIG. 6 is a top plan view of the slider.
Figure 7:
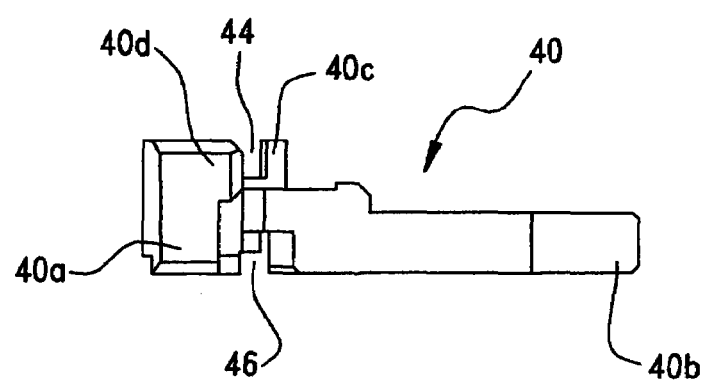
FIG. 7 is a front elevational view of the slider.

Referring to FIGS. 5-7 in conjunction with FIGS. 1-4, slider 40 of eject mechanism 18 includes a sliding body portion 40a which is slidably mounted on side wall section 12b of the housing for sliding movement in a straight-line sliding path indicated at "P0" in FIG. 1. A pushing arm 40b projects inwardly from body portion 40a, into cavity 20, for engaging a leading edge of the memory card. Therefore, the slider and the memory card move conjointly as the memory card is inserted into and withdrawn from cavity 20. The slider has an inside wall 40c and an outside wall 40d which is defined by body portion 40a. The walls form an elongated guide slot 44 at the top of the slider. Walls 40c and 40d form opposite side walls of guide slot 44, with the side walls being flat and generally planar. Referring back to FIG.1, "P1" defines a projection or longitudinal path of the inside surface of wall 40d, "P2" defines a projection or longitudinal path of the inside surface of wall 40c, and "P3" represents a projection or longitudinal path defined by guide slot 44. All of the paths "P0", "P1", "P2" and "P3" are generally parallel. Finally, a guide groove 46 is formed in the bottom of slider 40 generally where pusher arm 40b meets body portion 40a. The groove receives a guide rib 48 (FIG. 4) which projects upwardly from bottom plate 12d of housing 12.

With the above-described structure of slider 40, the heart-shaped cam slot which defines the "push/push" movement of the slider would be formed in an outside face 50 of body portion 40a, although the cam slot is not visible in the drawings. Spring 42 is a coil spring and is sandwiched between body portion 40a of the slider and the rear section 12a of the housing to bias the slider in an ejection direction.

When connector 10 is fully assembled, the elongated guide tabs 34 which project downwardly from top wall 14a of metal shell 14 project into the elongated guide slot 44 in the top of slider 40 of eject mechanism 18. Therefore, the opposite faces of guide tabs 34 provide longitudinal planar surfaces which oppose the planar surfaces at opposite sides of guide slot 44 as provided by side walls 40c and 40d of the slider. In essence, the opposite planar surfaces of guide tabs 34 provide a substantial surface area of engagement with the inside surfaces of side walls 40c and 40d of guide slot 44. This is in significant contrast to the very thin edge engagement of the prior art. The interengagement of guide rib 48 (FIG. 4) within guide groove 46 at the bottom of the slider stabilizes the sliding movement of the slider along side wall section 12b of housing 12.

FIG. 4 shows the height "H" of guide tabs 34 in comparison to the thickness "T" of the sheet metal material of top wall 14a of metal shell 14. It can be seen that the height of the guide tabs provide significant surface areas for guiding slider 40 in comparison to the thin thickness of the metal material of metal shell 14.

Finally, as stated above, two guide tabs 34 preferably are provided, rather than a single, long guide tab. The two guide tabs are separated by a section 38 of top wall 14a of the metal shell. This section of metal material rigidities the two guide tabs formed out of two openings 36, whereas a single guide tab formed out of a long opening would be less rigid. The spacing between the two guide tabs should be less than the length of guide slot 44 so that one of the guide tabs constantly is in engagement within the guide slot.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
an insulative housing having a terminal-mounting section which mounts a plurality of conductive terminals having contact portions for engaging appropriate contacts on a memory card and which at least in part defines a card-receiving cavity for receiving the memory card;
a card eject mechanism including a slider movably mounted on the housing and engageable with the memory card for movement therewith into and out of the cavity, and an ejection spring to bias the slider and memory card in an ejection direction, the slider having an elongated guide slot between a pair of opposite parallel side walls extending longitudinally in the direction of movement of the slider; and
a metal shell mounted on the housing and combining therewith in defining said card-receiving cavity, the shell including a generally planar top wall with an elongated guide tab, said elongated guide tab has a height and a length that is greater than said height and that defines an elongated edge, said elongated guide tab extends from said top wall, with said elongated edge extending therefrom and projecting into the guide slot of the slider and having opposite longitudinal planar surfaces opposing the side walls of the slot, said elongated guide tab being generally planar and extending in a direction generally perpendicular to the plane of said top wall.

2. The memory card connector of claim 1 wherein said metal shell is stamped and formed of sheet metal material, and the elongated guide tab is stamped and formed out of the top wall of the shell.

3. The memory card connector of claim 1 wherein said top wall forms a top of the cavity, and the elongated guide tab projects inwardly of the top wall.

4. The memory card connector of claim 3 wherein said metal shell is stamped and formed of sheet metal material, and the elongated guide tab is stamped and formed out of an opening in the top wall of the shell.

5. The memory card connector of claim 4 wherein the elongated guide tab height is generally perpendicular to said top wall and the top wall has a thickness, said height being significantly greater than the thickness of the top wall of the shell.

6. The memory card connector of claim 1, including a pair of said elongated guide tabs spaced from each other in the direction of movement of the slider.

7. The memory card connector of claim 6 wherein the spacing between the guide tabs is less than the length of the guide slot in the slider.

8. The memory card connector of claim 1 wherein said slider has a guide groove, and the housing has a guide rib projecting into the guide groove.

9. A memory card connector, comprising:
an insulative housing having a terminal-mounting section which mounts a plurality of conductive terminals having contact portions for engaging appropriate contacts on a memory card and which at least in part defines a card-receiving cavity for receiving the memory card, the housing having a guide rib at one side of the cavity;
a card eject mechanism including a slider movably mounted on the housing and engageable with the memory card for movement therewith into and out of the cavity, and an ejection spring to bias the slider and memory card in an ejection direction, the slider having an elongated guide slot between a pair of opposite parallel side walls extending longitudinally in the direction of movement of the slider, the slider also having a guide groove receiving the guide rib on the housing; and
a shielding metal shell mounted on the housing and combining therewith to define said card-receiving cavity, the shell being stamped and formed of sheet metal material and having a generally planar top wall forming a top of the cavity, the shell including an elongated, generally planar guide tab stamped and formed out of an opening in said top wall, the elongated guide tab has a height and a length that is greater than said height and that defines an elongated edge, said elongated guide tab extends from said top wall, with said elongated edge projecting into said guide slot and having opposite longitudinal planar surfaces opposing the side walls of the slot, said elongated guide tab extending in a direction generally perpendicular to the plane of said top wall.

10. The memory card connector of claim 9 wherein the elongated guide tab height is generally perpendicular to said top wall and the top wall has a thickness, said height being significantly greater than the thickness of the top wall of the shell.

11. The memory card connector of claim 9, including a pair of said elongated guide tabs spaced from each other in the direction of movement of the slider.

12. The memory card connector of claim 11 wherein the spacing between the guide tabs is less than the length of the guide slot in the slider.

13. A memory card connector for receiving a memory card in an insertion direction, comprising:

an insulative housing which at least in part defines a card-receiving cavity for receiving a memory card;

a card eject mechanism including a slider movably mounted on the housing and engageable with the memory card for movement therewith into and out of the cavity, the slider having an elongated guide slot between a pair of opposite parallel side walls extending longitudinally in the insertion direction; and a metal shell mounted on the housing and including a pair of guide tabs configured to project into said guide slot and having opposite longitudinal planar surfaces opposing the side walls of the slot, the guide tabs being spaced from each other and aligned in the insertion direction.

14. The memory card connector of claim 13 wherein said metal shell is stamped and formed of sheet metal material, and the elongated guide tabs are stamped and formed out of a wall of the shell.

15. The memory card connector of claim 13 wherein said metal shell has a top wall forming a top of the cavity, and the elongated guide tabs project inwardly of the top wall.

16. The memory card connector of claim 15 wherein said metal shell is stamped and formed of sheet metal material, and the elongated guide tabs are stamped and formed out of openings in the top wall of the shell.

17. The memory card connector of claim 16 wherein the metal shell includes a top wall with a thickness and said elongated guide tabs have a height generally perpendicular to said top wall, said height being significantly greater than the thickness of the top wall of the shell.

18. The memory card connector of claim 13 wherein the spacing between the guide tabs is less than the length of the guide slot in the slider.

19. The memory card connector of claim 13 wherein said slider has a guide groove opposite said guide slot, and the housing has a guide rib projecting into the guide groove.

* * * * *